United States Patent
Warden et al.

(10) Patent No.: US 7,743,244 B2
(45) Date of Patent: Jun. 22, 2010

(54) COMPUTER SYSTEM MODEL GENERATION WITH TRACKING OF ACTUAL COMPUTER SYSTEM CONFIGURATION

(75) Inventors: Jon Duane Warden, Ft. Collins, CO (US); Zengfa Gao, Ft. Collins, CO (US); Wade J. Satterfield, Ft. Collins, CO (US); Michael R. Stabnow, Ft. Collins, CO (US); Todd M. Spencer, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 846 days.

(21) Appl. No.: 11/590,025

(22) Filed: Oct. 31, 2006

(65) Prior Publication Data

US 2008/0104389 A1    May 1, 2008

(51) Int. Cl.
*G06F 1/24* (2006.01)
*G06F 9/00* (2006.01)

(52) U.S. Cl. .................. 713/100; 713/1; 703/13; 703/21

(58) Field of Classification Search .......... 713/1, 713/100; 703/13, 21
See application file for complete search history.

(56) References Cited

U.S. PATENT DOCUMENTS

| | | | |
|---|---|---|---|
| 5,920,873 A | 7/1999 | Van Huben et al. | |
| 6,088,693 A | 7/2000 | Van Huben et al. | |
| 6,094,654 A | 7/2000 | Van Huben et al. | |
| 6,393,387 B1* | 5/2002 | Adriaans et al. | 703/27 |
| 7,249,347 B2* | 7/2007 | Chang et al. | 717/113 |
| 7,356,452 B1* | 4/2008 | Naamad et al. | 703/22 |
| 7,376,945 B1* | 5/2008 | Kakumani et al. | 717/171 |
| 7,478,149 B2* | 1/2009 | Joshi et al. | 709/223 |
| 7,574,343 B2* | 8/2009 | Levi et al. | 703/13 |
| 2002/0184365 A1* | 12/2002 | Lumley | 709/224 |
| 2003/0208284 A1* | 11/2003 | Stewart et al. | 700/30 |
| 2004/0051731 A1* | 3/2004 | Chang et al. | 345/734 |
| 2004/0054504 A1* | 3/2004 | Chang et al. | 702/186 |
| 2004/0054618 A1* | 3/2004 | Chang et al. | 705/38 |
| 2004/0054758 A1* | 3/2004 | Chang et al. | 709/219 |
| 2005/0125212 A1* | 6/2005 | Hunt et al. | 703/21 |
| 2006/0025985 A1* | 2/2006 | Vinberg et al. | 703/22 |
| 2006/0034263 A1* | 2/2006 | Outhred et al. | 370/352 |
| 2006/0149838 A1* | 7/2006 | Hunt et al. | 709/224 |
| 2006/0248159 A1* | 11/2006 | Polan | 709/208 |
| 2006/0271341 A1* | 11/2006 | Brown et al. | 703/1 |
| 2006/0294439 A1* | 12/2006 | Rolia et al. | 714/47 |
| 2007/0011330 A1* | 1/2007 | Dinker et al. | 709/226 |
| 2007/0067351 A1* | 3/2007 | Singh et al. | 707/200 |
| 2007/0112847 A1* | 5/2007 | Dublish et al. | 707/103 R |
| 2007/0220481 A1* | 9/2007 | Gabel et al. | 717/106 |
| 2007/0281707 A1* | 12/2007 | Thomson et al. | 455/446 |

* cited by examiner

*Primary Examiner*—Thomas Lee
*Assistant Examiner*—Jaweed A Abbaszadeh

(57) ABSTRACT

The present invention provides a system and method for generating models of a computer system. The method involves generating an original model of a computer system in an original configuration, and performing an original series of changes of the original model to yield an intermediate model. The original series of changes is recorded. The method further involves tracking the actual configuration of the computer system so as to detect a revised configuration of the computer system. Then, a resultant model is generated that corresponds to the computer system in a potential resultant system configuration that would result from a series of reconfigurations corresponding to said original series of changes or a revision thereof being applied to the system in its revised configuration rather than in its original configuration.

9 Claims, 4 Drawing Sheets

COMPUTER SYSTEM MODEL GENERATION WITH TRACKING OF ACTUAL COMPUTER SYSTEM CONFIGURATION

BACKGROUND OF THE INVENTION

Herein, related art may be discussed to put the invention in context. Related art labeled "prior art" is admitted prior art; related art not labeled "prior art" is not admitted prior art.

In data centers, computer systems are often reconfigured to expand capabilities or more effectively utilize existing resources. The performance, utilization, or other metric resulting from a proposed reconfiguration can be estimated by modeling the proposed reconfiguration and its operation. The model for the reconfiguration is typically reached by modifying a model of an actual configuration. However, the process of reconfiguring and evaluating models may extend over days, weeks, or months. In the meantime, some actual reconfigurations may have taken place, either due to an unplanned failure or some upgrade or modification that is not coordinated with the main reconfiguration planning processor. In that case, the reconfiguration process may have to be restarted from the new actual configuration. The present invention addresses this and other problems as is apparent from the description below with reference to the following drawings.

BRIEF DESCRIPTION OF THE DRAWINGS

The following drawings are of embodiments of the invention and not of the invention itself. In the Figures, a dot-dash style border indicates a graphical representation generated in accordance with an embodiment of the present invention.

DETAILED DESCRIPTION

The present invention provides for recording an original series of changes made to an original model of a computer system in an original configuration. If, in the meantime, the computer system assumes a revised configuration, a model generator generates a resultant model corresponding to the computer system in a potential resultant configuration corresponding to the revised configuration with the series of changes applied. If the series of changes is inconsistent with the revised configuration, the series can be revised before being applied to the revised configuration.

Figure 1:
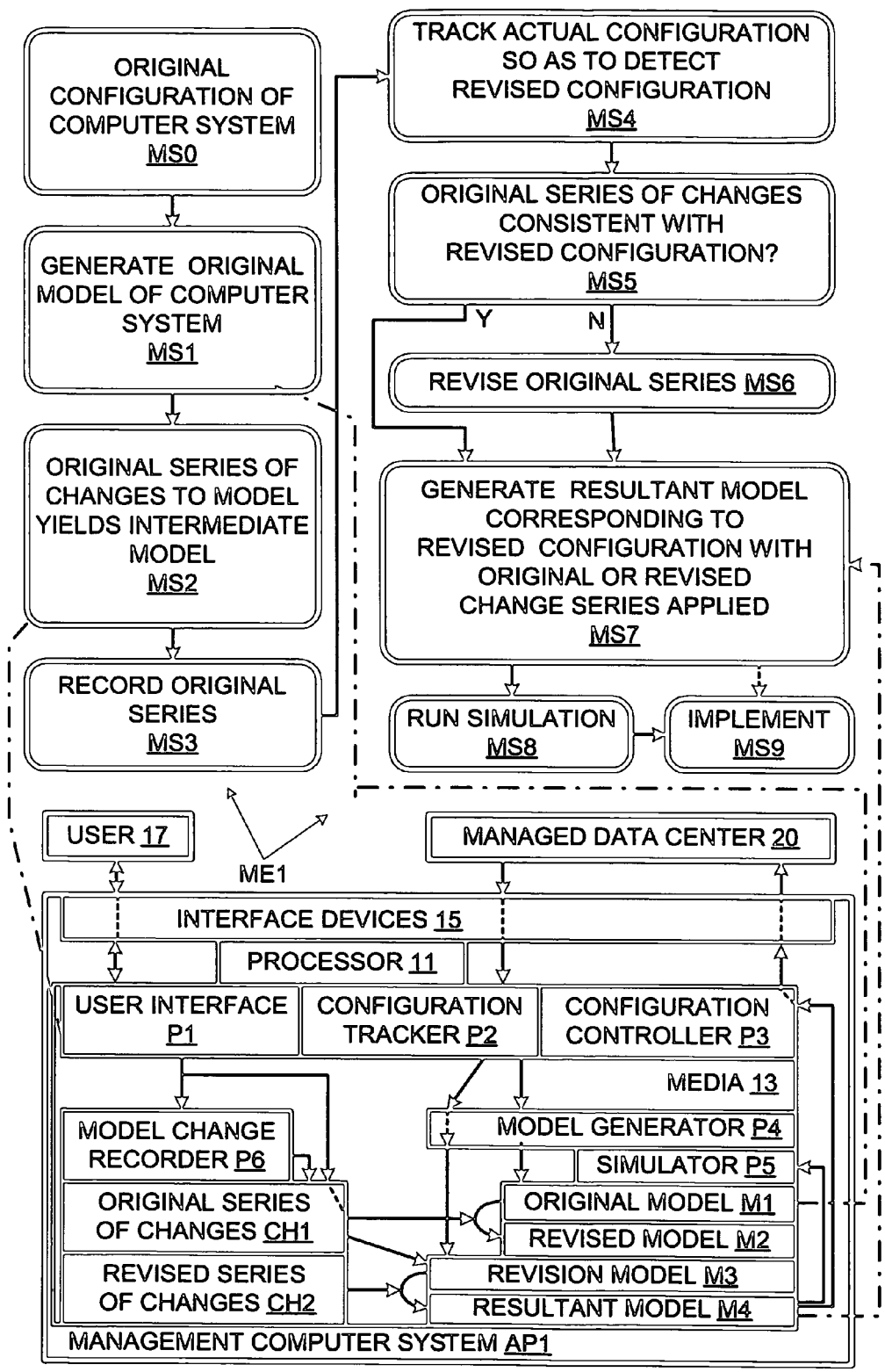
FIG. 1 is a combination of a schematic diagram and a flow chart of a system and a method in accordance with an embodiment of the invention.

A management computer system AP1, shown in FIG. 1, is used to reconfigure and otherwise manage other computer systems in a managed data center 20. Management computer system AP1 includes a processor 11, media 13, which can include disk storage and solid-state memory, and input/output devices 15. Input-output devices can include a network interface card connecting management computer system AP1 to a network; in this case, a management workstation on the network can provide for user interface devices such as a display, mouse, and keyboard for interacting with computer models. In an alternative embodiment, the input devices can include a display, a keyboard, and a mouse for interface with an administrative user 17, and a network interface card for interfacing with computers in the managed data center 20.

Media 13 stores software components including a graphic user interface P1, a configuration tracker P2, a configuration controller P3, a model generator P4, a simulator P5, and a model change recorder P6. Model generator P4 generates models of data center 20, including models M1, M2, M3, and M4. Recorder P6 records series of changes to the models, including change series CH1 and CH2. Collectively, these software components implement a program and method ME1, represented in FIG. 1 as having method segments MS0-MS9.

Method ME1 starts with a computer system, e.g., data center 20, in an original configuration, at method segment MS0. An original model M1 of data center 20 in its original configuration is generated at method segment MS1. At method segment MS2, the original model is changed, e.g., by user 17 using computer input devices such as a mouse and keyboard, to define a revised model M2. Model change recorder P6 records this original series of changes at method segment MS3 so as to generate recorded series of changes CH1.

Configuration tracker P2 detects a revised configuration of data center 20, at method segment MS4. In the illustrated embodiment, the actual system configuration is checked periodically. In alternative embodiments, the detection can be in response to a user action, e.g., either in response to a request to check the system configuration or in response to a user request to generate a new model.

At method segment MS5, model generator P4 determines whether or not the current actual system configuration is consistent with the recorded series of model changes CH1. If the actual configuration has changed since first model M1 was generated, the original series of changes applied to first model M1 may or may not be consistent with the revised configuration. For example, a change involving adding memory to a server that has failed in the interim is inconsistent with the revised configuration including the failed server. If it is inconsistent with the revised configuration, the stored series of changes CH1 can be revised to yield a revised series of changes CH2 at method segment MS6.

If at method segment MS5 the proposed changes are consistent or once they are made consistent at method segment MS6, model generator P4 generates a resultant model M4 corresponding to the revised configuration with the original or revised series of changes applied at method segment MS7. In the illustrated embodiment, model generator P4 first generates revision model M3, corresponding to data center 20 in its revised configuration; then, depending on the outcome of the consistency determination at method segment MS5, model generator P4 applies either original change series CH1 or revised change series CH2 to revision model M3 to obtain resultant model M4. In an alternative embodiment, a revision model is not explicitly generated.

The performance, utilization, or other metrics of the proposed reconfiguration is evaluated by simulation at method segment MS8. If the simulation results are positive, the proposed reconfiguration can be implemented on the actual computer system at method segment MS9. Alternatively, the new configuration can be implemented at method segment MS9 without first running the simulation of method segment MS8, as indicated by dashed arrow D between method segments MS7 and MS9.

Figure 2:
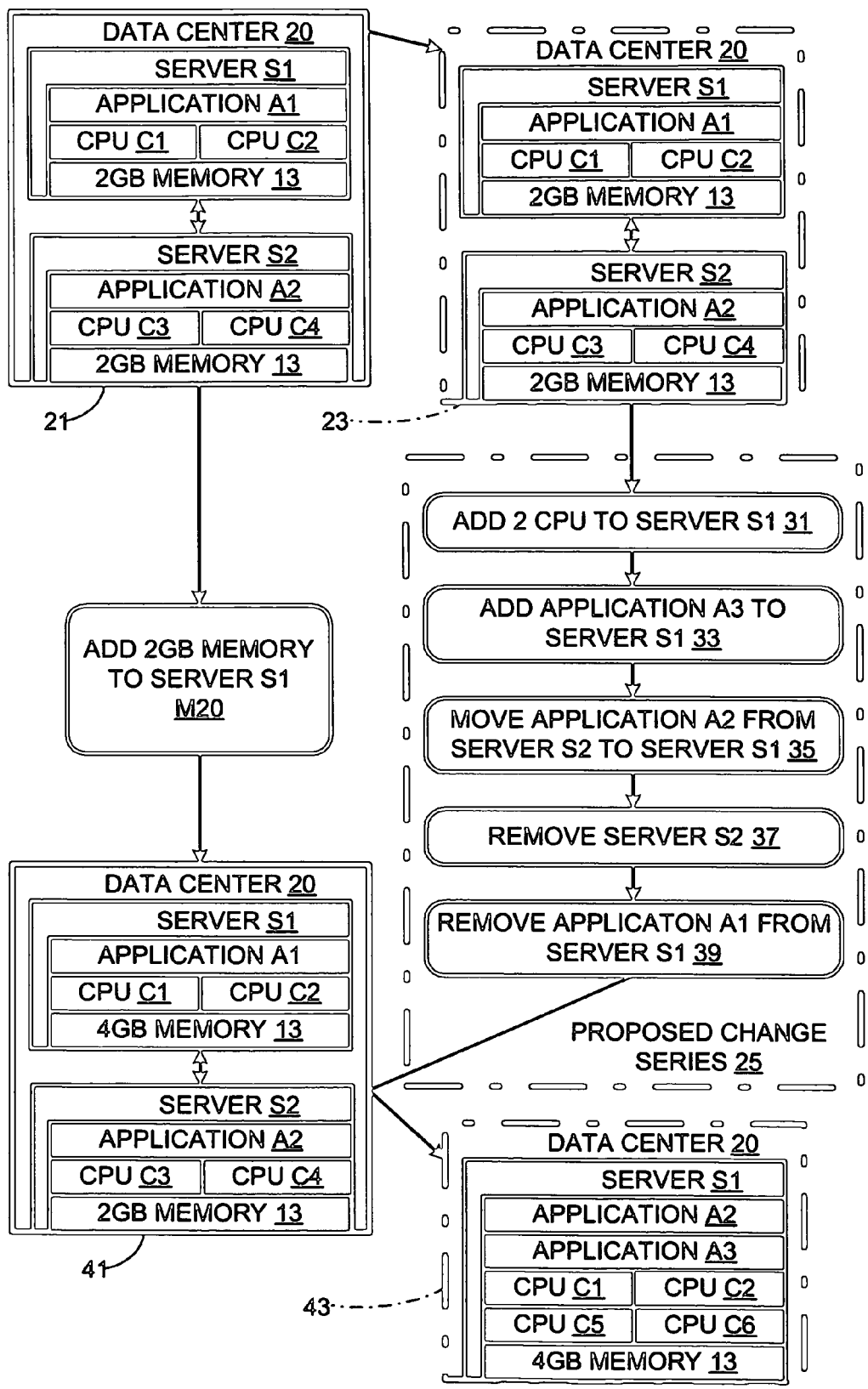
FIG. 2 depicts possible aspects of the method of FIG. 1 under a first scenario.

A first scenario for method ME1 is depicted in FIG. 2. The original configuration of a data center 20 is represented at 21, while original model M1 is represented at 23. A proposed change series 25 comprises five reconfiguration steps: adding two CPUs to server S1 at 31, adding an application A3 to server S1 at 33, moving application A2 from server S2 to S1 at 35, removing server S2 at 37, and removing application A1 from server S1 at 39.

While this proposed change series was set aside and being considered, two gigabytes of memory is added to server S1 at method segment M20, yielding the revised configuration shown at 41. When the proposed change series is next displayed this new actual configuration is detected at method segment MS4 (FIG. 1). At method segment MS5, it is determined that the revised actual configuration is consistent with proposed change series 25. Accordingly, method segment MS6 is bypassed. At method segment MS7, a graphic representation 43 of the result of applying proposed change series 25 to the current configuration 41 of data center 20 is generated. A performance simulation is applied to the model corresponding to the graphic representation shown at 43. If the simulation is favorable, the configuration at 43 can be implemented in actual data center 20.

Figure 3:
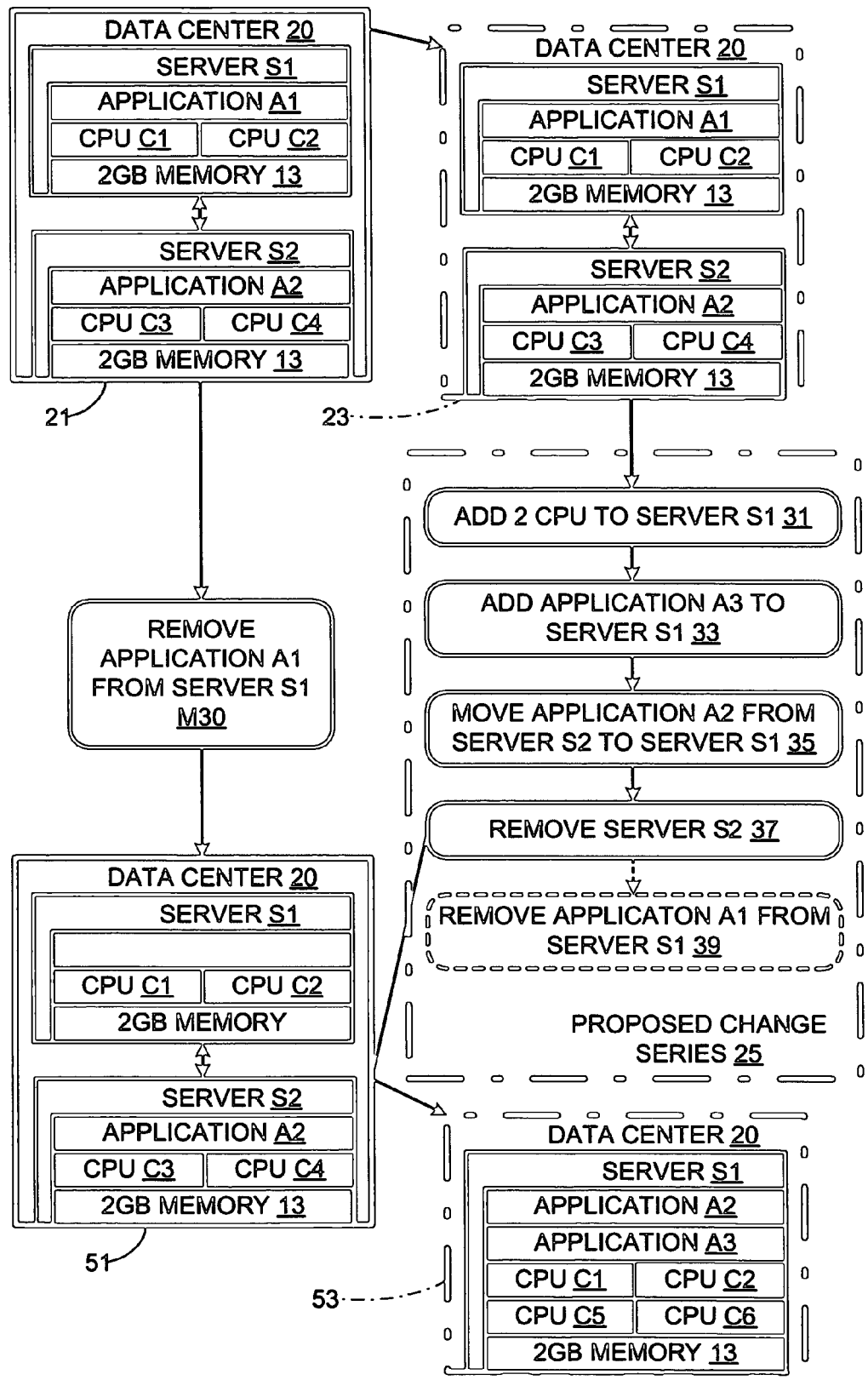
FIG. 3 depicts possible aspects of the method of FIG. 1 under a second scenario.

A second scenario for method ME1 is shown in FIG. 3. The same proposed change series 25 is involved, but at method segment M30 application A1 is removed from actual server S1, yielding the data center 20 as represented at 51 in FIG. 3. At method segment MS5, the consistency of proposed change series 25 with current actual data configuration 51 is checked and an inconsistency is noted. At method segment MS6, the last step 39 in the change series is removed (the removal indicated by the dashed line). At method segment MS7, a representation 53 of the result of applying the revised proposed change series to actual configuration 51 is generated as indicated in FIG. 3. Using the graphical user interface, the user is warned that a proposed change has already been implemented in the managed data center.

Figure 4:
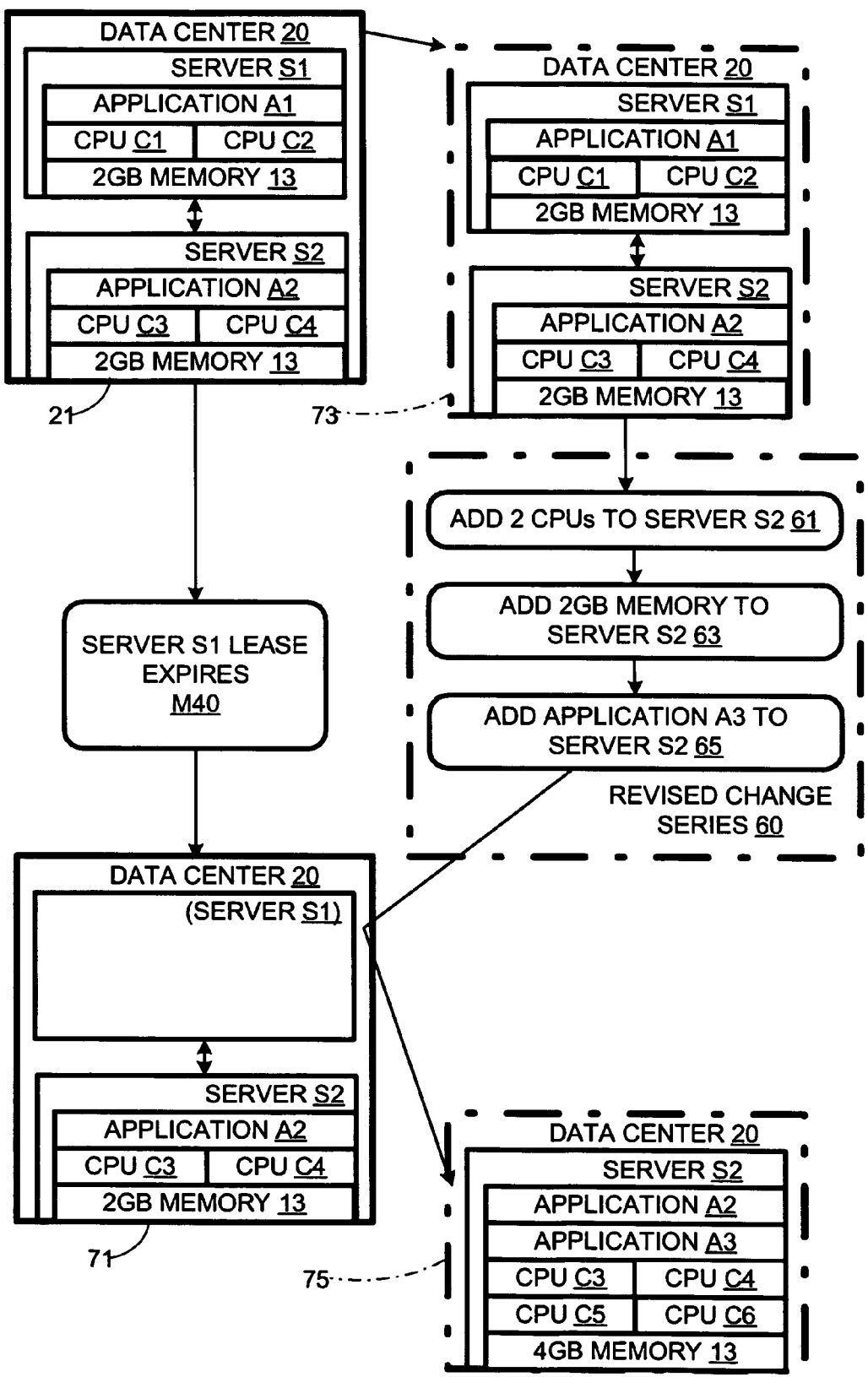
FIG. 4 depicts possible aspects of the method of FIG. 1 under a third scenario.

A third scenario for method ME1 is indicated in FIG. 4. The original proposed change series 25 is not shown in FIG. 4, but is the same as for the scenarios of FIG. 2 and of FIG. 3. In the meantime, the lease expires for server S1, which is taken off line. This results in the new actual configuration shown at 71. At method segment MS5, it is determined that the proposed changes to server S1 cannot be applied. Accordingly, proposed change series 25 is scrapped in favor of a revised proposed change series 60 at method segment MS6.

The new series 60 is based on shifting work to still-licensed server S2 instead of using expired server S1. Series 60 includes adding two CPUs for server S2 at change 61, adding two gigabytes (2 GB) of memory to server S2 at change 63, and adding application A3 to server S2 at change 65. After a recheck of the current actual configuration of data center 20 (assuming no further actual configuration changes), this revised series 60 is applied to a newly generated model 73 of current actual data center 20 to yield resultant model 75. The simulation is applied to resultant model 75 at method segment MS8, and the configuration of model 75 is applied to data center 20 at MS9. Method ME1 can be applied recursively in that method segments MS2-MS7 can be applied to the intermediate or resultant model and, in general, to any model generated by model generator P4.

Herein, a "configuration" is an arrangement of computer elements, including hardware, software, and firmware, that specifies their nature, number, and other characteristics that affect system function and performance. Herein, one series of changes is a "revision" of an original series of changes if the revision is derived by adding, deleting and changing changes of the original series. A series of changes generated independently (i.e., "from scratch") would not qualify as a "revision" as that term is used herein.

The invention applies to centrally managed multi-computer systems. Any number of computers can be involved; the computers can be complexes partitioned using partitioning solutions such as hard partitions or virtual partitions. The numbers of CPUs, the amount of memory, and the nature and quantity of I/O devices are different for different embodiments. The manner in which a system is represented graphically can vary, as can the methods used to manipulate the graphic images. These and other variations upon and modifications to the illustrated embodiments are provided for by the present invention, the scope of which is defined by the following claims.

What is claimed is:

1. A method comprising:
   computer-generating an original model of a computer system in an original configuration;
   performing an original series of changes to said original model to yield an intermediate model that corresponds to a potential configuration of said computer system but does not correspond to a past or current actual configuration of said computer system;
   recording said original series of changes;
   tracking the actual configuration of said computer system so as to detect a revised configuration of said computer system, said revised configuration being different from said original configuration;
   computer-generating a resultant model corresponding to said computer system in a potential resultant system configuration that would result from a series of reconfigurations corresponding to said original series of changes or a revision thereof being applied to said system in said revised configuration.

2. A method as recited in claim 1 further comprising:
   determining whether or not said original series of changes is consistent with said revised configuration, said series of reconfigurations corresponding to said original series of changes if said original series of changes is determined to be consistent with said revised configuration.

3. A method as recited in claim 2 further comprising, in the event that said original series is determined to be inconsistent with said revised configuration, revising said original series of changes so that said series of reconfigurations corresponds to said revision of said original series of changes.

4. A method as recited in claim 1 further comprising passing said resultant model to a simulator to perform a simulation of said resultant model.

5. A method as recited in claim 1 further comprising passing said resultant model to an implementer to perform an implementation of said resultant model so that said system is reconfigured to assume a resultant configuration corresponding to said resultant model.

6. A system comprising
   a configuration tracker for detecting configurations of a computer system, said configurations including an original configuration and a subsequent revised configuration;
   an interface permitting a user to apply an original series of changes to an original model to yield an intermediate model that corresponds to a potential configuration of said computer system but does not correspond to a past or current actual configuration of said computer system;
   recorder means for recording said original series of changes; and
   a model generator for generating said original model and a resultant model of said computer system, said original model corresponding to said original configuration, said resultant model corresponding to a resultant configuration that would result from a series of reconfigurations corresponding to said original series of changes or a revision thereof being applied to said computer system starting from said revised system configuration.

7. A system as recited in claim 6 wherein:
said model generator determines whether or not said original series of changes is consistent with said revised configuration; and
said interface permits a user to modify said original series of changes to yield said revision of thereof.

8. A system as recited in claim 6 further comprising a simulator for performing a simulation using said resultant model.

9. A system as recited in claim 6 further comprising an implementer for implementing said resultant model so that said computer system assumes said resultant configuration.

* * * * *